US011988368B1

(12) United States Patent
Harnisch

(10) Patent No.: US 11,988,368 B1
(45) Date of Patent: May 21, 2024

(54) PORTABLE LIGHT SYSTEM

(71) Applicant: Brian W. Harnisch, Granbury, TX (US)

(72) Inventor: Brian W. Harnisch, Granbury, TX (US)

( * ) Notice: Subject to any disclaimer, the term of this patent is extended or adjusted under 35 U.S.C. 154(b) by 0 days.

(21) Appl. No.: 18/389,477

(22) Filed: Nov. 14, 2023

(51) Int. Cl.
*F21V 21/22* (2006.01)
*F21L 4/00* (2006.01)
*F21V 21/08* (2006.01)
*F21V 21/28* (2006.01)
*F21Y 115/10* (2016.01)

(52) U.S. Cl.
CPC ................ *F21V 21/22* (2013.01); *F21L 4/00* (2013.01); *F21V 21/08* (2013.01); *F21V 21/28* (2013.01); *F21Y 2115/10* (2016.08)

(58) Field of Classification Search
CPC .......... F21V 21/22; F21V 21/08; F21V 21/28; F21L 4/00
See application file for complete search history.

(56) References Cited

U.S. PATENT DOCUMENTS 7,073,926 B1 * 7/2006 Kremers ................. F21V 21/22 362/427
8,322,877 B1 * 12/2012 Merritt .................... F21L 14/04 362/384
10,663,124 B1 5/2020 Smith
11,549,669 B2 1/2023 Vartan
2005/0036308 A1 2/2005 Wright
2009/0225536 A1 * 9/2009 Emmert .................. F21L 14/04 362/220
2010/0142213 A1 6/2010 Bigge et al.
2013/0094196 A1 4/2013 Wessel
2014/0049953 A1 * 2/2014 Moore ................ F16M 11/245 362/220
2017/0219187 A1 8/2017 Lema
2018/0266666 A1 * 9/2018 Liao ........................ F21L 14/04
2019/0093866 A1 3/2019 Thomas
2020/0326060 A1 * 10/2020 Fitch ....................... F21V 21/28
2021/0080089 A1 3/2021 Carmi

* cited by examiner

*Primary Examiner* — Leah Simone Macchiarolo
(74) *Attorney, Agent, or Firm* — Cramer Patent & Design PLLC; Aaron R. Cramer

(57) ABSTRACT

The portable light system may comprise a base, a boom, an extender, a first tool holder, a second tool holder, a third tool holder, a floodlight, and a flashlight. The portable light system may be a system of armatures that is self-standing and operable to direct light towards one or more objects. The base may comprise a quadripod stand with a telescoping vertical support. The extender and the boom may extend and redirect the system of armatures. A plurality of tool holders comprising the first tool holder, the second tool holder, and the third tool may be individually coupled to the system of armatures to hold a tool. The floodlight and the flashlight may be operable to provide illumination.

10 Claims, 13 Drawing Sheets

PORTABLE LIGHT SYSTEM

RELATED APPLICATIONS

None.

FIELD OF THE DEVICE

The present device relates generally to portable lighting devices, and more particularly to a versatile and adjustable portable light system designed for a variety of settings. The device encompasses an adjustable telescoping armature equipped with a boom, extender, and multiple tool holders for positioning various lighting tools and devices.

BACKGROUND OF THE DEVICE

Portable lighting solutions have become increasingly important in both recreational and professional settings where fixed lighting installations are absent or insufficient. Traditional portable lighting devices, such as flashlights and work lamps, offer limited adjustability and often fail to address the need for hands-free operation and precise directional control. Furthermore, the use of these conventional devices in uneven terrains, under vehicles, or in emergency roadside situations poses additional challenges in terms of stability and positioning flexibility.

While various designs for portable lighting exist, they often lack the ability to integrate multiple types of lighting tools in one system or the capacity to conveniently adjust to a wide range of heights and angles. Existing systems also seldom provide solutions for balancing the weight of the lighting device, which is crucial when extending the reach of the light source to prevent tipping. Moreover, the need for a power source often limits the mobility of portable light systems, making them less effective in remote or outdoor locations.

Therefore, there is a need for a portable light system that overcomes these limitations by offering a stable, adjustable framework capable of accommodating different lighting devices and tools. Such a system should allow for easy adjustment and secure positioning at various heights and angles, while also being collapsible for ease of transport and storage. Additionally, integrating features such as a counterweight mechanism that can double as a power inverter would further enhance the utility and adaptability of the lighting system in various environments.

SUMMARY OF THE DEVICE

The present disclosure encompasses embodiments of a portable light system, which include an overall telescoping armature featuring a base, numerous pole segments, and an assortment of adjustment mechanisms for modifying the pole segments' lengths. Additionally, these embodiments incorporate a quadripod stand that supports the armature, where the stand has legs pivotally attached to a leg hub.

In certain embodiments, the legs are designed to be storable in parallel to the base. There is also a boom assembly that contains a boom arm, a first boom coupler to attach the boom arm to the telescoping armature, a hinge for pivotal movement, and a lock to secure the position. At least one extender is present, equipped with a first and second extender arm connected via a hinge, and includes a coupler for attaching to a tool or armature component at the far end.

A variety of tool holders are provided, such as a first tool holder with a fork for connecting a floodlight, a second holder designed for a flashlight, and a third holder featuring a clip for securing various objects. The embodiments may include one or more illumination devices, which could be a floodlight with numerous LED lights, or a flashlight featuring LED lights within its cylindrical housing.

Additionally, at least one adapter is present for affixing the illumination device or tool holders to the telescoping armature, boom, or extender as necessary. There is also at least one counterweight for the boom arm's balance, which, in some configurations, can be swapped with a power inverter that comprises a battery, an inverter circuit, and at least one AC outlet.

The boom arm, extender, and tool holders are designed to be adjustable to extend, retract, and pivot, allowing the user to direct illumination or secure tools in the desired arrangement. Furthermore, the portable light system is collapsible for storage and easily transportable for field use.

In certain configurations, the base is vertically adjustable in relation to the leg hub, with each leg of the quadripod stand being at least sixteen inches long and capable of sliding under a vehicle for illumination tasks. The overall telescoping armature includes a main coupler and a lock nut at the highest pole segment to ensure secure attachment of the boom, extender, or tool holders.

The boom assembly is capable of extending the system's reach and directing it as needed via an adjustable boom arm in length and rotation. The first tool holder can connect a floodlight to the system using a fork equipped with coupling fasteners and an eyelet that allows rotational and pivotal movement of the connected floodlight.

The second tool holder is suitable for holding a flashlight, while the third holder can secure a smartphone, microphone, or an alternative light source. The floodlight may include a power cord with a switch, and the flashlight may be battery-powered, featuring its own power switch.

The adjustment mechanisms facilitate the sliding and rotation of the base or individual pole segments in relation to adjacent sections, controlled by loosening and tightening the associated knobs. The system further incorporates at least one cord grip for securing electrical cords or cables.

Embodiments also detail a method for using the portable light system, which involves unfolding and locking the legs of the quadripod stand, adjusting the height of the telescoping armature, attaching the boom and/or extender, and configuring them for the desired reach and direction. This method also includes attaching the appropriate tool holder to the boom or extender's end and activating the illumination device to light up an area. When available, a power inverter serves as both a counterweight and a source of AC power for the floodlight or other devices.

BRIEF DESCRIPTION OF THE DRAWINGS

The advantages and features of the present device will become better understood with reference to the following more detailed description and claims taken in conjunction with the accompanying drawings, in which like elements are identified with like symbols, and in which:

DESCRIPTIVE KEY

Figure 1:
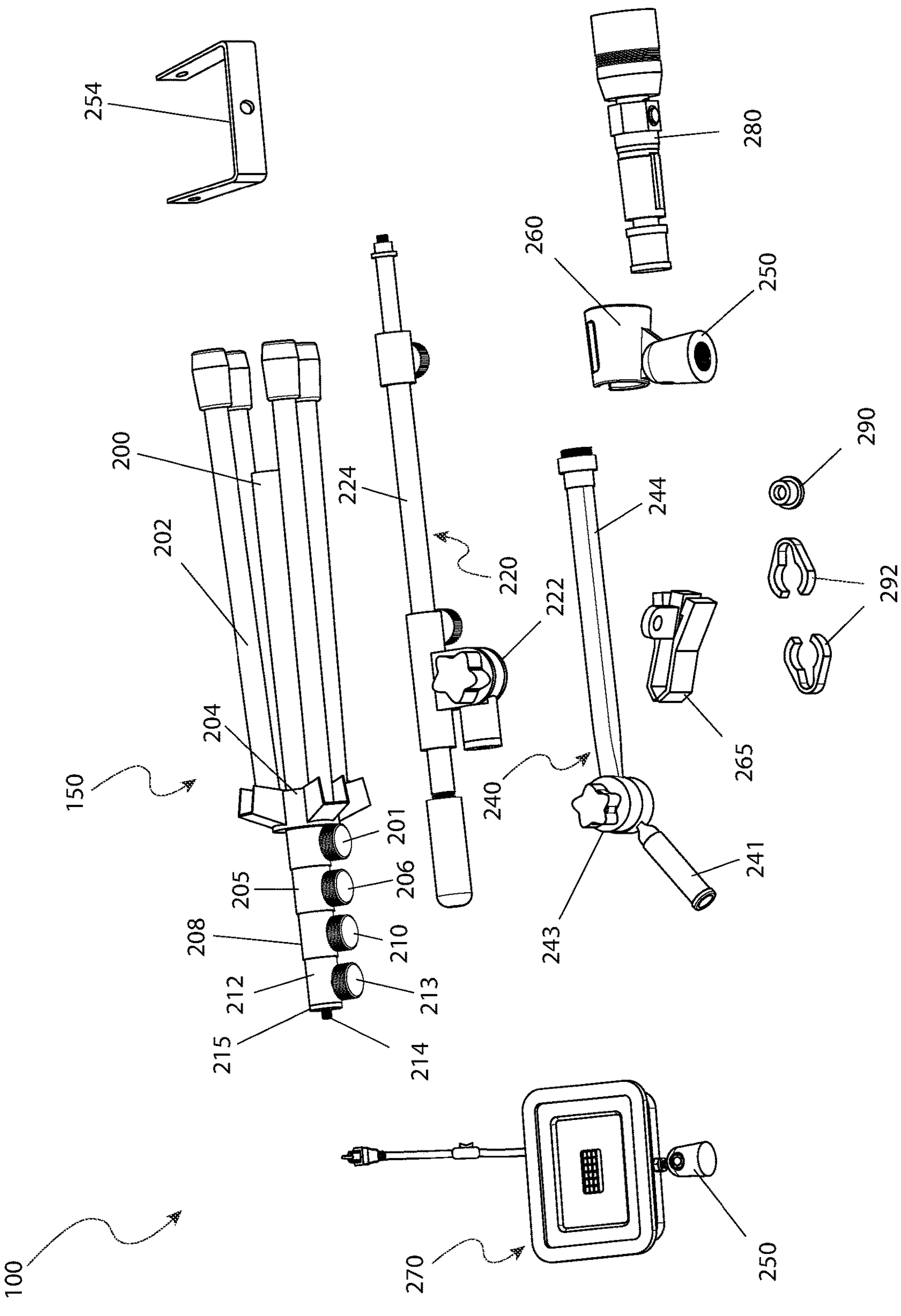
FIG. 1 is an exploded view of a portable light system 100, according to an embodiment of the present device, illustrating an telescoping armature 150, a boom 220, an extender 240, a first tool holder 250, a second tool holder 260, a third tool holder 265, a floodlight 270, a flashlight 280, one (1) or more adapters 290, and one (1) or more cord grips 292.

100 portable light system
150 telescoping armature
200 base
201 first adjustment mechanism
202 leg
203 foot
204 leg hub
205 first pole segment
206 second adjustment mechanism
208 second pole segment
210 third adjustment mechanism
212 third pole segment
213 fourth adjustment mechanism
214 main coupler
215 main lock nut
220 boom
221 first boom coupler
222 boom hinge
223 boom pivot lock
224 boom arm
225 first boom extension nut
226 boom extension arm

227 second boom extension nut
228 second boom coupler
229 counterweight
230 power inverter
232 battery
234 inverter circuit
236 AC outlet
240 extender
241 first extender arm
242 locking nut
243 extender hinge
244 second extender arm
245 second extender coupler
246 extender pivot lock
250 first tool holder
254 fork
260 second tool holder
262 flashlight holder
265 third tool holder
267 clip
268 clip pivot
270 floodlight
270*a* first coupling fastener
270*b* second coupling fastener
270*c* eyelet
271 floodlight LED lights
272 floodlight housing
274 power cord
275 floodlight power switch
280 flashlight
281 flashlight LED lights
282 cylindrical housing
283 flashlight power switch
290 adapter
292 cord grip
300 boom tool end
302 boom counterweight end 1. Description of the Device The present device is directed to a portable light system (herein described as the "device") 100, as seen in an exemplary embodiment in FIG. 1. The device 100 may comprise an telescoping armature 150, a boom 220, an extender 240, a first tool holder 250, a second tool holder 260, a third tool holder 265, a floodlight 270, and a flashlight 280. The telescoping armature 150 may be a system of armatures that is self-standing and operable to direct light towards one (1) or more objects. The telescoping armature 150 may comprise a quadripod stand with a three-section telescoping vertical support that comprises a first pole segment 205, a second pole segment 208, and a third pole segment 212. The boom 220 and the extender 240 may be coupled individually or cumulatively to the telescoping armature 150 via the main coupler 214, the first tool holder 250, and adapter 290 (if necessary) in order to extend and redirect the device 100. A plurality of tool holders comprising the first tool holder 250, the second tool holder 260, and the third tool holder 265 may be individually coupled to the telescoping armature 150, the boom 220, or the extender 240, either directly thereto or via a first tool holder 250 and adapter 290 (if necessary) to form the desired configuration in order to hold a tool.

By way of example and not of limitation, the tools may comprise the floodlight 270, the flashlight 280, and an alternative light source. The device 100 may be operable to hold non-illuminating devices such as a smart phone, magnet, mirror, umbrella, or a microphone.

As non-limiting examples, the device 100 may be used to illuminate a campsite, a hunting area, a backyard, a commercial shop, a home or a roadside repair scene, a nighttime children's game, a social gathering, a car photography session, or other venue that requires a portable source of illumination. The device 100 may disassemble and fold for ease of transportation. The combination of the telescoping armature 150, the boom 220, and the extender 240 may enable a wide range of motions to position the illumination, or alternately providing shade, exactly where it is needed. Such illumination can be a conventional light source and such shade can be an umbrella, although it is appreciated that other similar items can be used.

Figure 2:
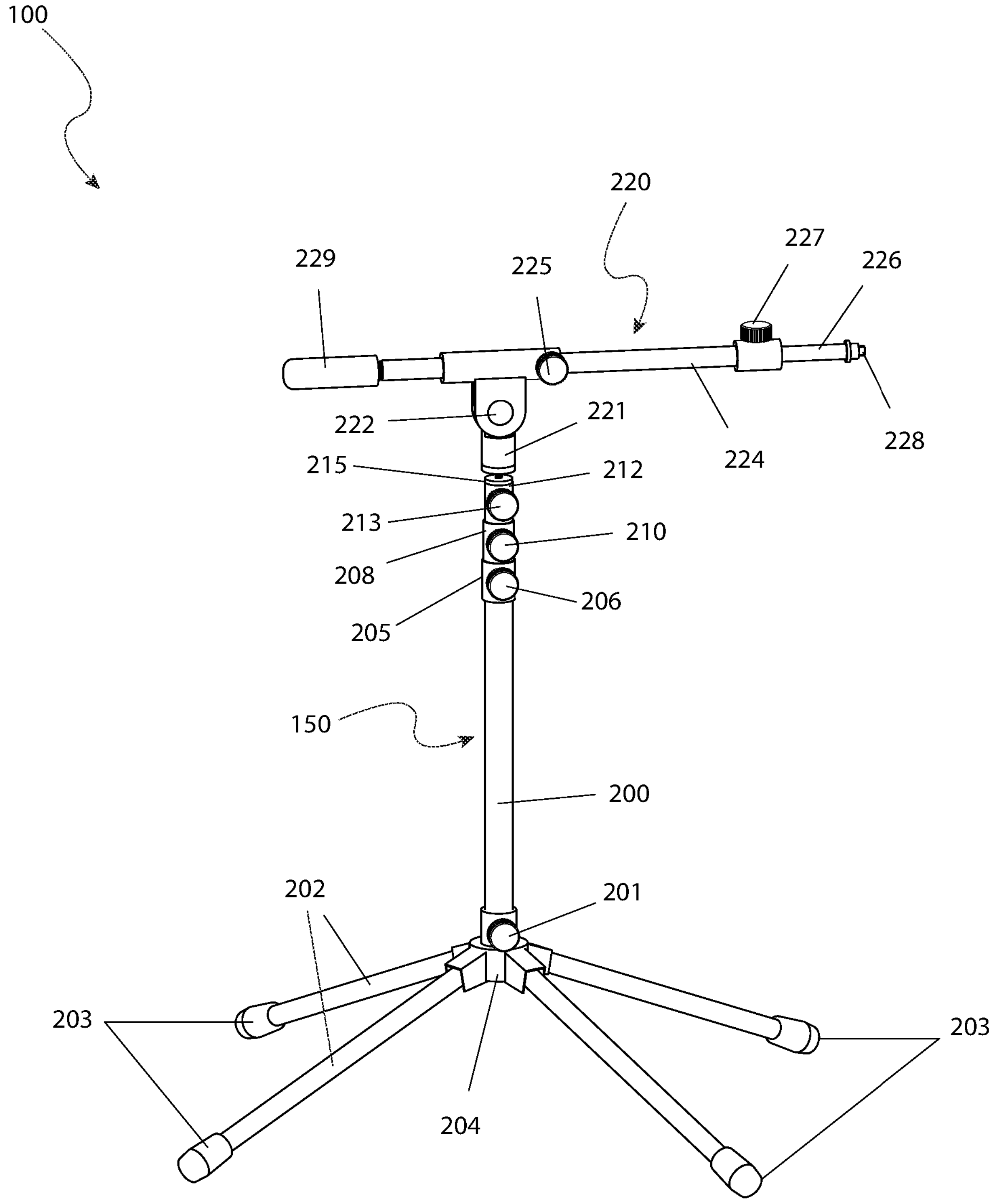
FIG. 2 is an isometric view of a portable light system 100, according to an embodiment of the present device, illustrating an telescoping armature 150 and a boom 220.

Referring now to FIG. 2, the telescoping armature 150 includes a base 200 that is vertically adjustable relative to a leg hub 204, which pivotally supports a plurality of legs 202 thereto. The base 200 has a plurality of pole segments telescopically arranged and coupled thereto, on the opposing end from the leg hub 204. The base 200 may provide a stable footprint to support the device 100 and the tools. The plurality of legs 202 may pivotably couple to the leg hub 204 via a plurality of leg hinges. In a preferred embodiment, there may be four (4) legs in order to optimize stability.

An individual leg 202 may be at least sixteen inches (16 in.) long. The individual leg 202 may be shorter than the height of the base 200 when fully collapsed. When the base 200 is in use, the top of the individual legs 202 may be three inches (3 in.) or lower such that the legs 202 may slide under an automobile. A foot 203 or similar article may be removably attached to the bottom of each leg 202.

For storing, the plurality of legs 202 may be pivoted upwards such that the individual legs 202 are generally parallel to the base 200. Alternatively, the leg hub 204 may slide up the base 200 and the plurality of legs 202 may pivot downward such that the individual legs 202 are parallel to the base 200.

The base 200 may comprise a portion of an telescoping armature 150 that is vertically-oriented during use and that which may be collapsed to reduce the overall height, such as for storage and transportation, and that which may be expanded to increase the overall height during use. The base 200 is controlled vertically relative to the leg hub 204 with a first adjustment mechanism 201.

In a preferred embodiment, the telescoping armature 150 may comprise three (3) additional sections. The three (3) additional sections may be of different diameters such that they may telescopically slide to lengthen or shorten the telescoping armature. A first pole segment 205 is telescopically adjustable relative to the base 200 and controlled with a second adjustment mechanism 206. A second pole segment 208 is telescopically adjustable relative to the first pole segment 205 and controlled with a third adjustment mechanism 210. A third pole segment 212 is telescopically adjustable relative to the second pole segment 205 and controlled with a fourth adjustment mechanism 213. Such adjustment mechanisms 201, 206, 210, 213 may comprise features that enable the base 200 or individual pole segments 205, 208, 212 to slide relative to an adjacent section when a leg section extension nut is loosened by turning a locking knob, and prevented from sliding relative to the adjacent section when the leg section extension nut is tightened by turning the locking knob in the opposite rotational direction.

Figure 9:
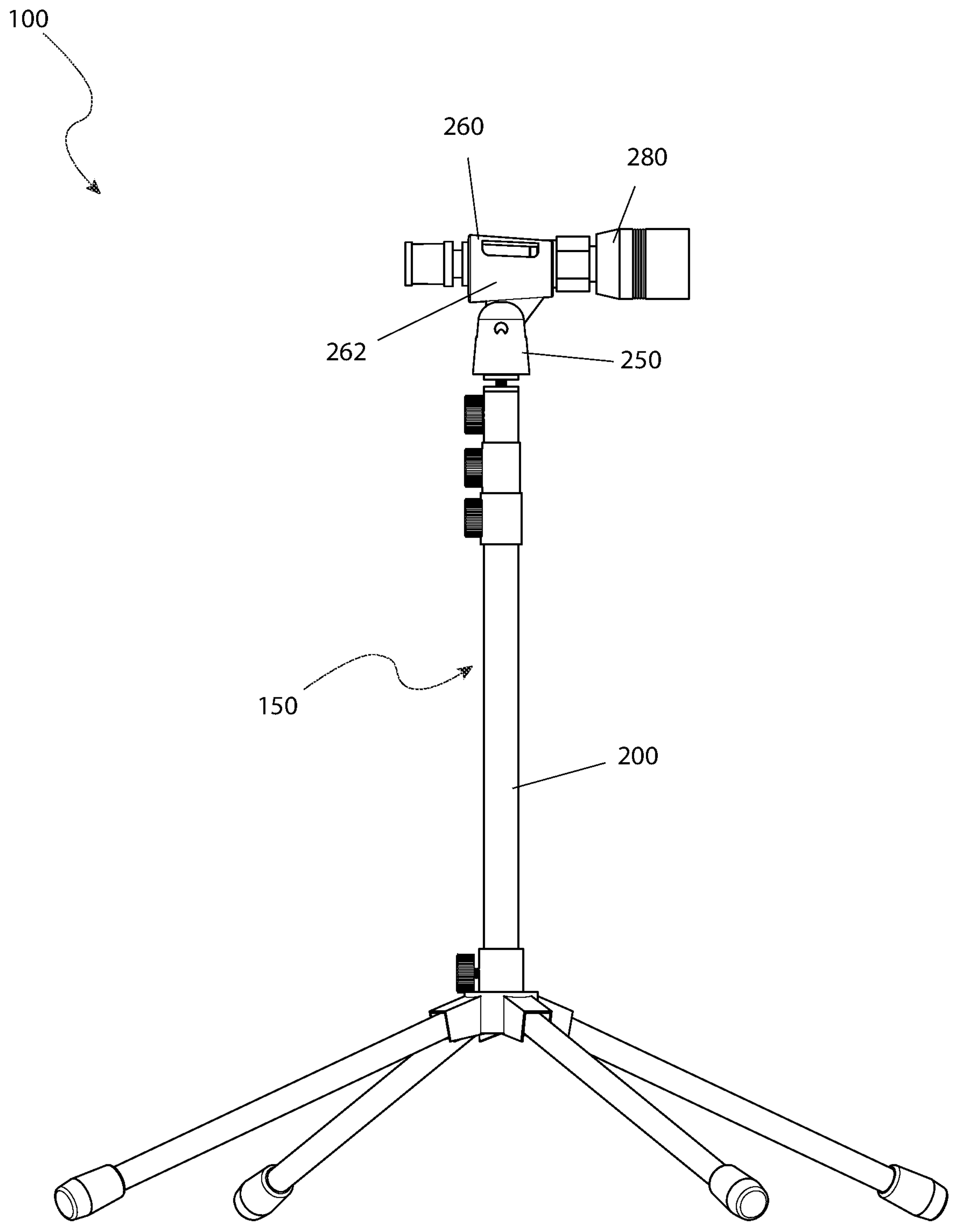
FIG. 9 is an isometric view of a portable light system 100, according to an embodiment of the present device, illustrating an telescoping armature 150, a first tool holder 250 equipped with a second tool holder 260, and a flashlight 280.
Figure 10:
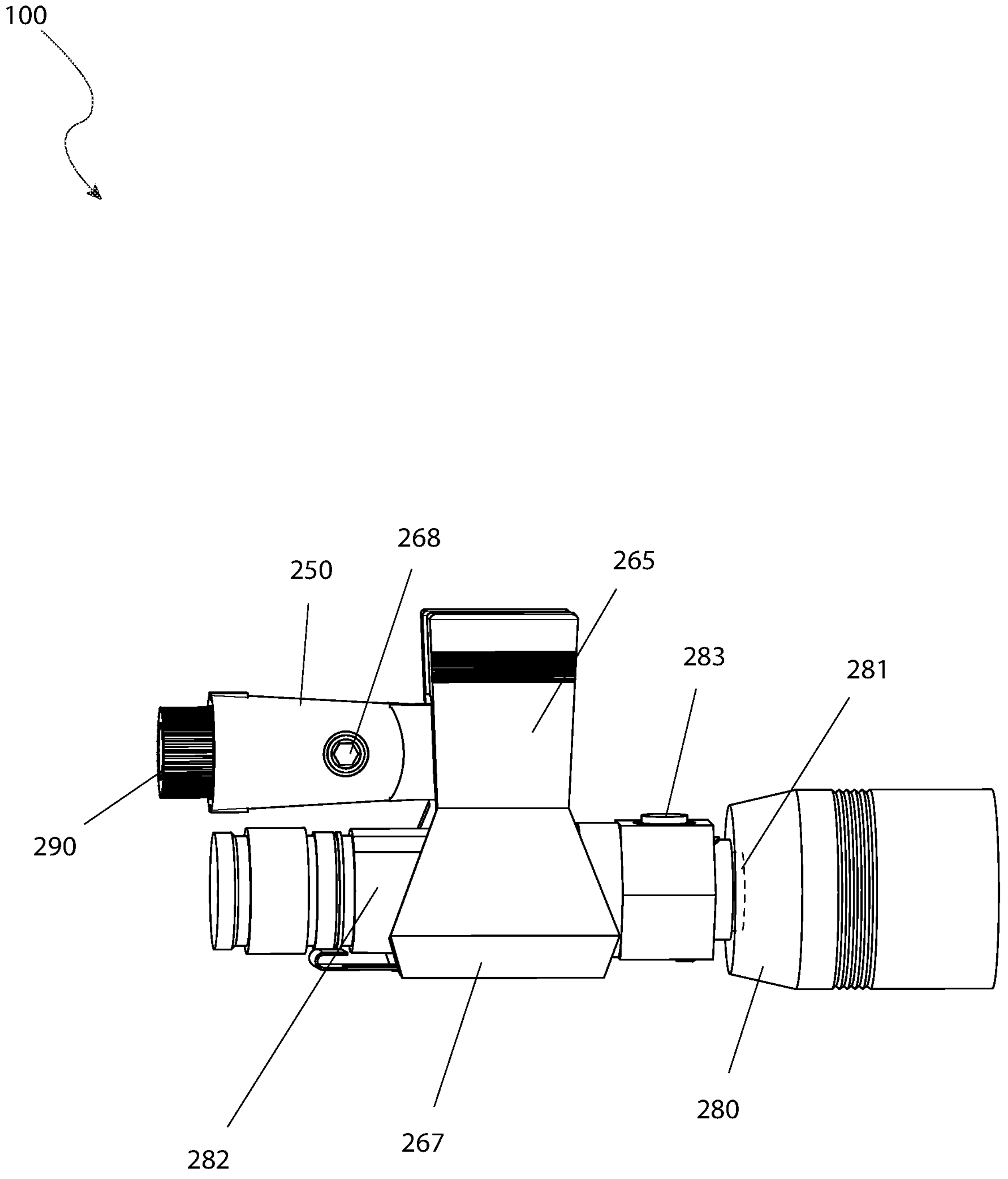
FIG. 10 is a detail view of a portable light system 100, according to an embodiment of the present device, illustrating a first tool holder 250 equipped with a third tool holder 265, and a flashlight 280.

A main coupler 214 and main lock nut 215 may be located at the top of the third pole segment 212 of the telescoping armature 150. The main coupler 214 may be operable to couple the boom 220 (as seen in FIGS. 1, 2, 5-8 11, 12), the extender 240 (as seen in FIGS. 1, 3 and 6-8), the first tool holder 250 (as seen in FIGS. 1, 4-9 and 13), the second tool holder 260 (as seen in FIGS. 1 and 9), or the third tool holder 265 (as seen in FIGS. 1, 10) to the third pole segment 212 of the telescoping armature 150. The main lock nut 215 may secure the extender 240, the boom 220, or the first tool holder 250 to the main coupler 214 of the third pole segment 212 of the telescoping armature 150. This connection may extend/retract and/or rotate through three hundred sixty degrees (360°) by loosening the second adjustment mechanism 206, third adjustment mechanism 210, and/or fourth adjustment mechanism 213. Each of the individual pole segments 205, 208, and/or 212 can then be extended, retracted, and/or rotated to achieve the desired configuration. Then the desired configuration is secured by tightening each of the adjustment mechanisms 206, 210, 213.

Figure 11:
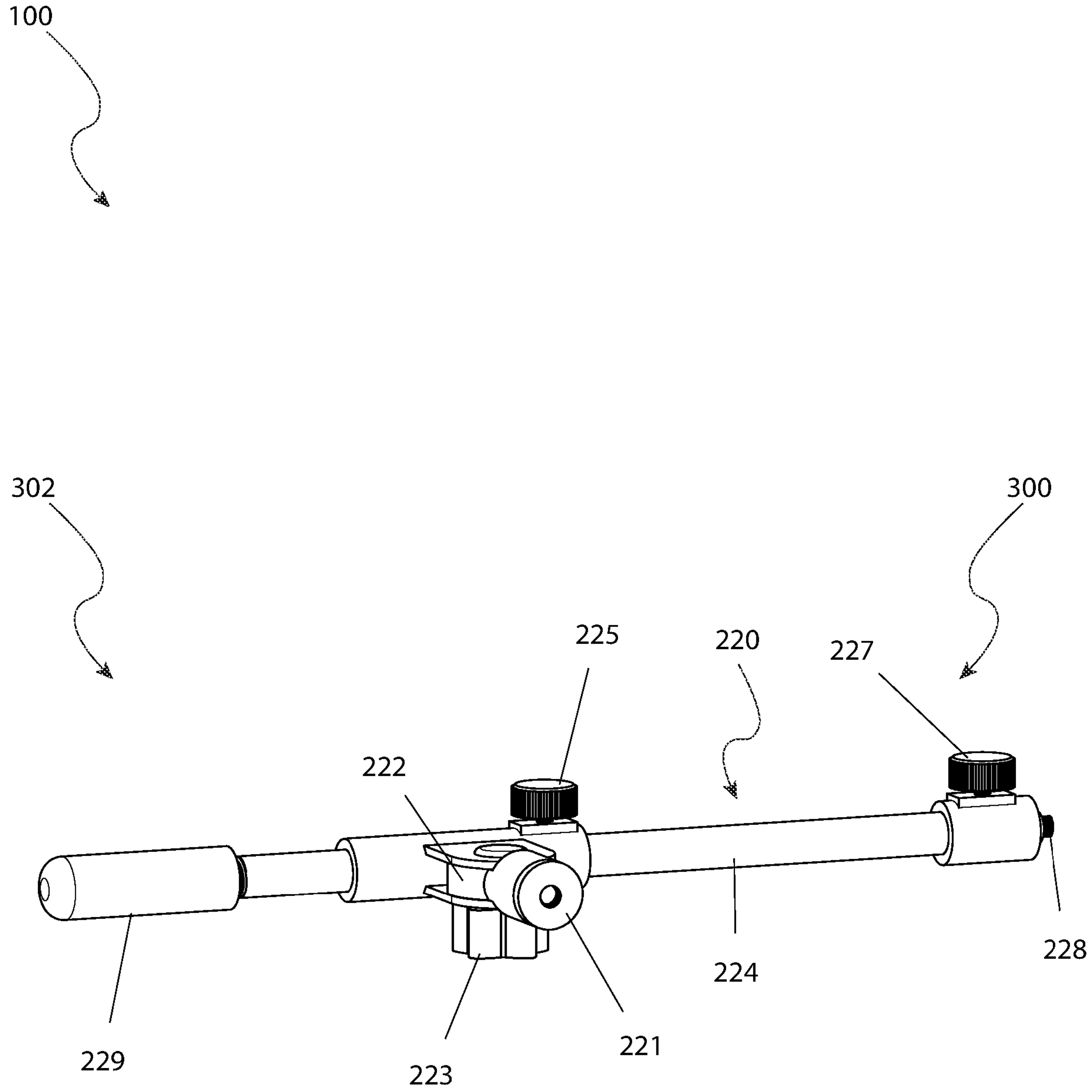
FIG. 11 is a detail view of a portable light system 100, according to an embodiment of the present device, illustrating a boom 220 with a counterweight 229.

Referring more closely to FIG. 11, the boom 220 may be a straight armature that may couple to the telescoping armature 150 and/or to the extender 240. The boom 220 may extend the reach of the device 100 and may redirect the device 100. The boom 220 may comprise a first boom coupler 221, a boom hinge 222, a boom arm 224, and a counterweight 229. The first boom coupler 221 may couple the boom 220 to the telescoping armature 150. The first boom coupler 221 may be pivotably coupled to the boom arm 224 via the boom hinge 222. The boom arm 224 may pivot via the boom hinge 222 through an angle of one hundred eighty degrees (180°) by loosening a boom pivot lock 223, pivoting the boom arm 224, and tightening the boom pivot lock 223.

The boom arm 224 may be slidably coupled to the boom hinge 222. The boom arm 224 may slide through the boom hinge 222 and rotate through three hundred sixty degrees (360°) when a first boom extension nut 225 is loosened and may be prevented from sliding through the boom hinge 222 or further rotating when the first boom extension nut 225 is tightened. The boom arm 224 may define a boom tool end 300 and a boom counterweight end 302. The boom tool end 300 may comprise a second boom coupler 228. The second boom coupler 228 may be operable to couple the extender 240 or the first tool holder 250 to the boom arm 224. The adapter 290 may or may not be required to facilitate the connection to the second boom coupler 228.

The boom counterweight end 302 may comprise a threaded fitting where the counterweight 229 may couple to the boom arm 224. The counterweight 229 may be selected from a plurality of counterweights of different sizes such that the weight may be selected to optimally balance the tool coupled to the boom tool end 300.

In some embodiments, the boom arm 224 may telescopically change length. A boom extension arm 226 may telescopically slide into or out of the boom arm 224 to lengthen or shorten the boom 220 when a second boom extension nut 227 is loosened and may the boom extension arm 226 be prevented from telescoping when the second boom extension nut 227 is tightened. The second boom coupler 228 may also rotate through a three hundred sixty degrees (360°) angle when the second boom extension nut 227 is loosened.

Figure 12:
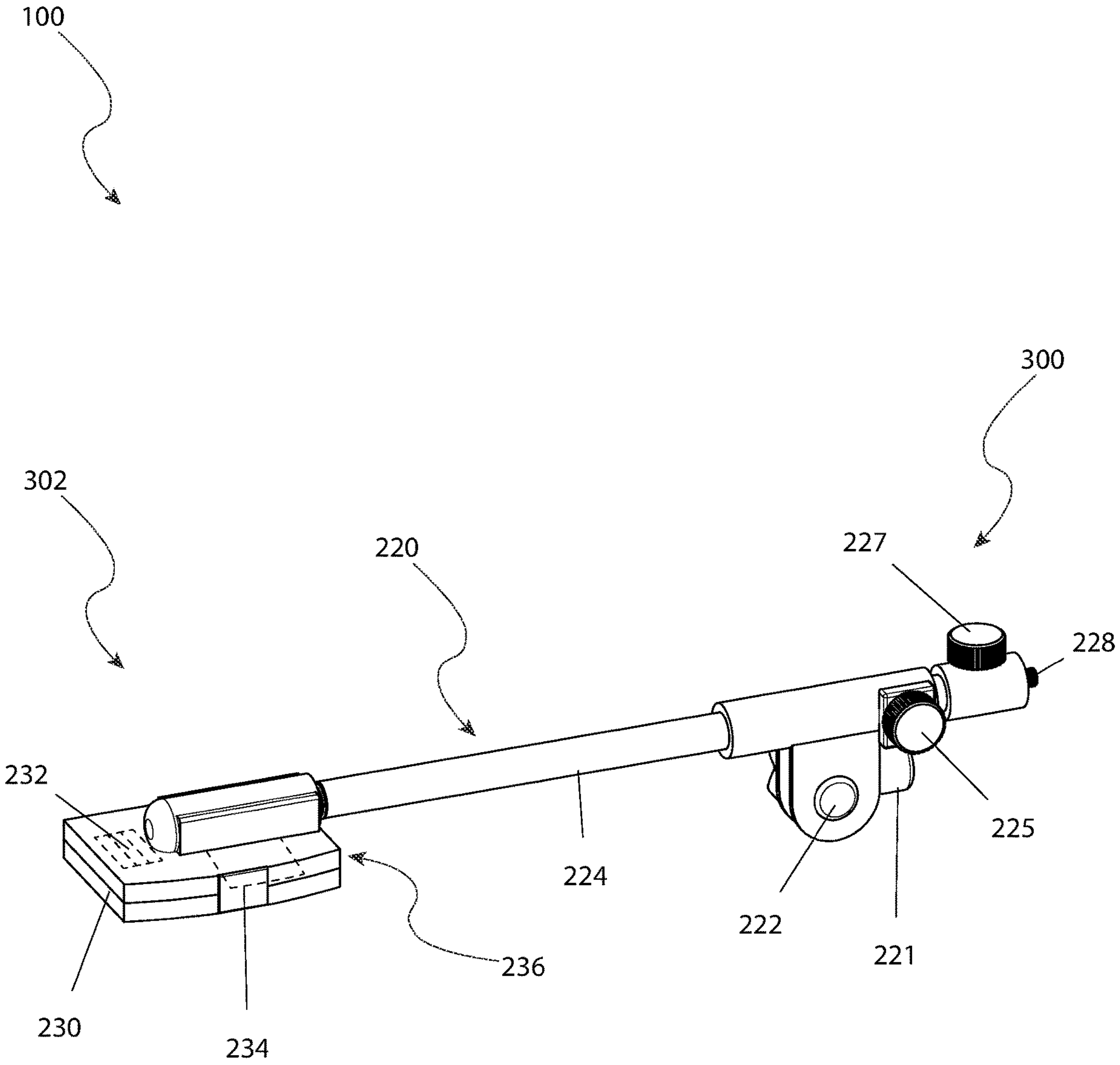
FIG. 12 is a detail view of a portable light system 100, according to an embodiment of the present device, illustrating a boom 220 with a power inverter 230; and, FIG. 13 is a close-up exploded view of a fork 254 coupling a floodlight 270 to a first tool holder 250.

In some embodiments, such as that illustrated in FIG. 12, the counterweight 229 may be interchangeably replaced with a power inverter 230. The power inverter 230 may couple to the boom counterweight end 302 of the boom 220. The power inverter 230 may provide the weight needed to balance the boom 220. The power inverter 230 may comprise one (1) or more batteries 232, an inverter circuit 234, one (1) or more USB outlets, and at least one (1) AC outlet 236 preferably located at an easy-to access position. The inverter circuit 234 may convert a DC voltage supplied by the batteries 232 into an AC voltage that may be available at any AC outlet 236 on the power inverter 230. As a non-limiting example, the output of any AC outlet 236 may be an AC voltage in the range of one hundred ten to one hundred twenty volts (110-120 VAC) with a frequency of fifty to sixty (50-60 Hz).

Figure 3:
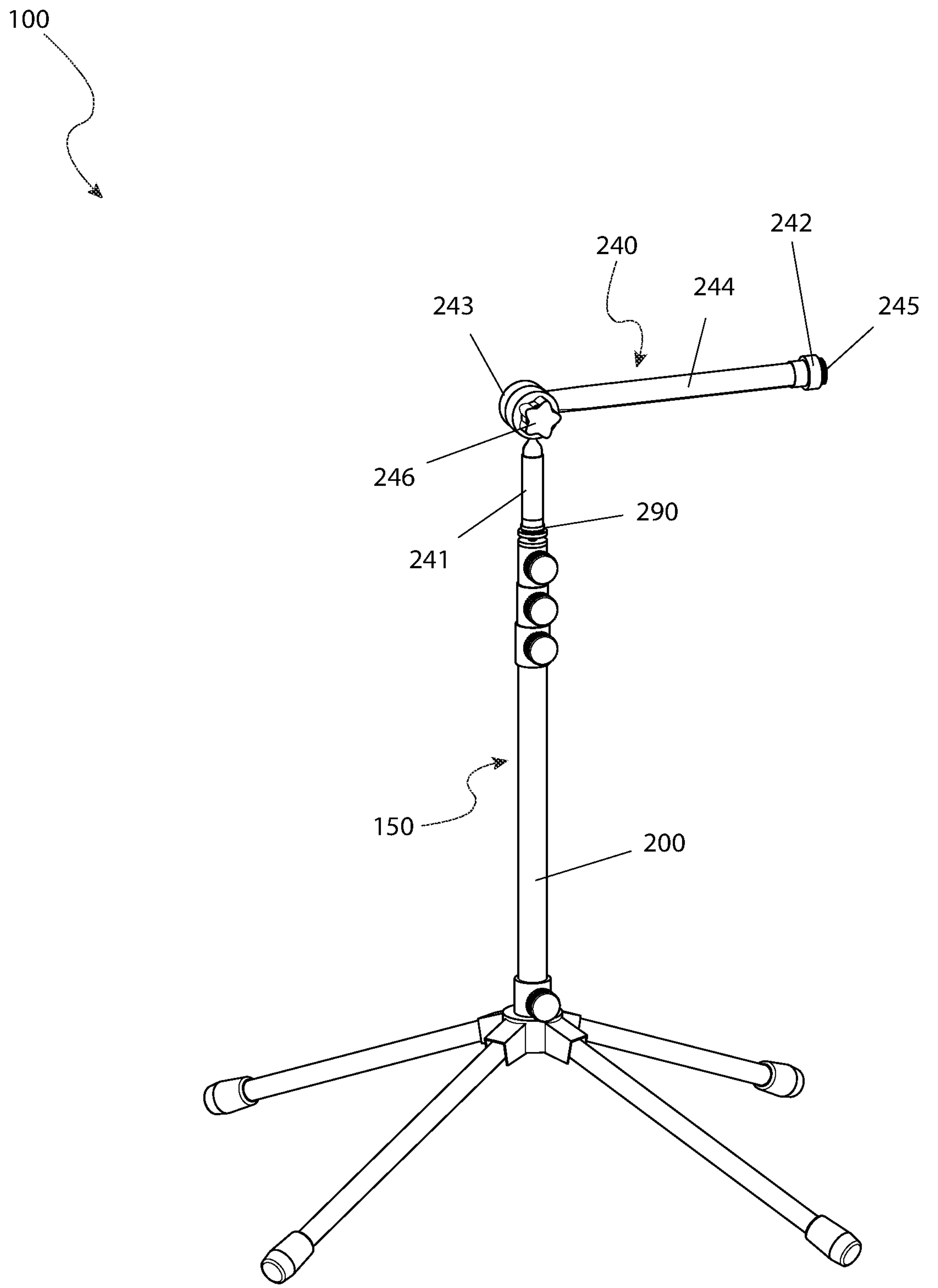
FIG. 3 is an isometric view of a portable light system 100, according to an embodiment of the present device, illustrating an telescoping armature 150 and an extender 240.
Figure 4:
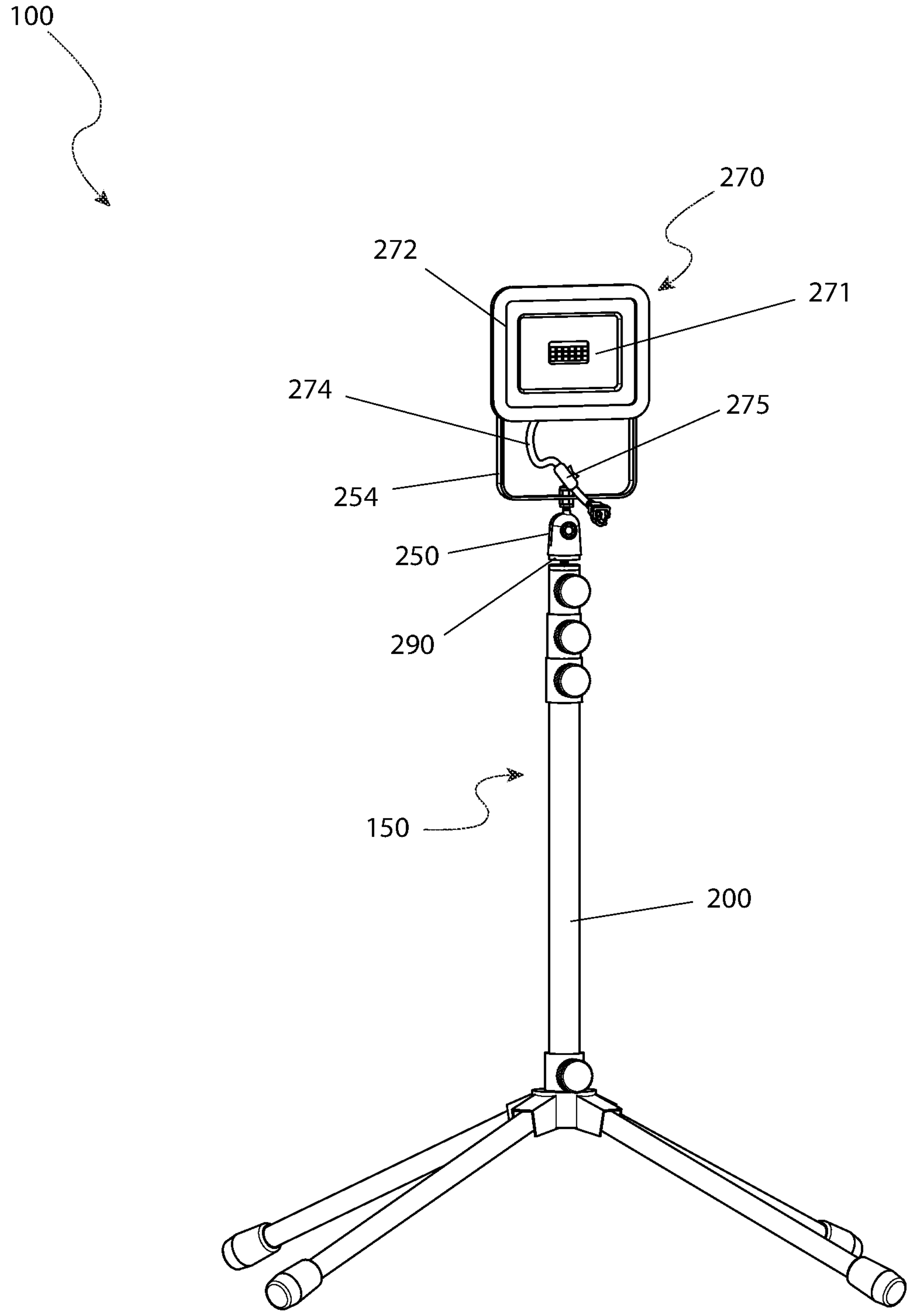
FIG. 4 is an isometric view of a portable light system 100, according to an embodiment of the present device, illustrating an telescoping armature 150, a first tool holder 250, and a floodlight 270.
Figure 5:
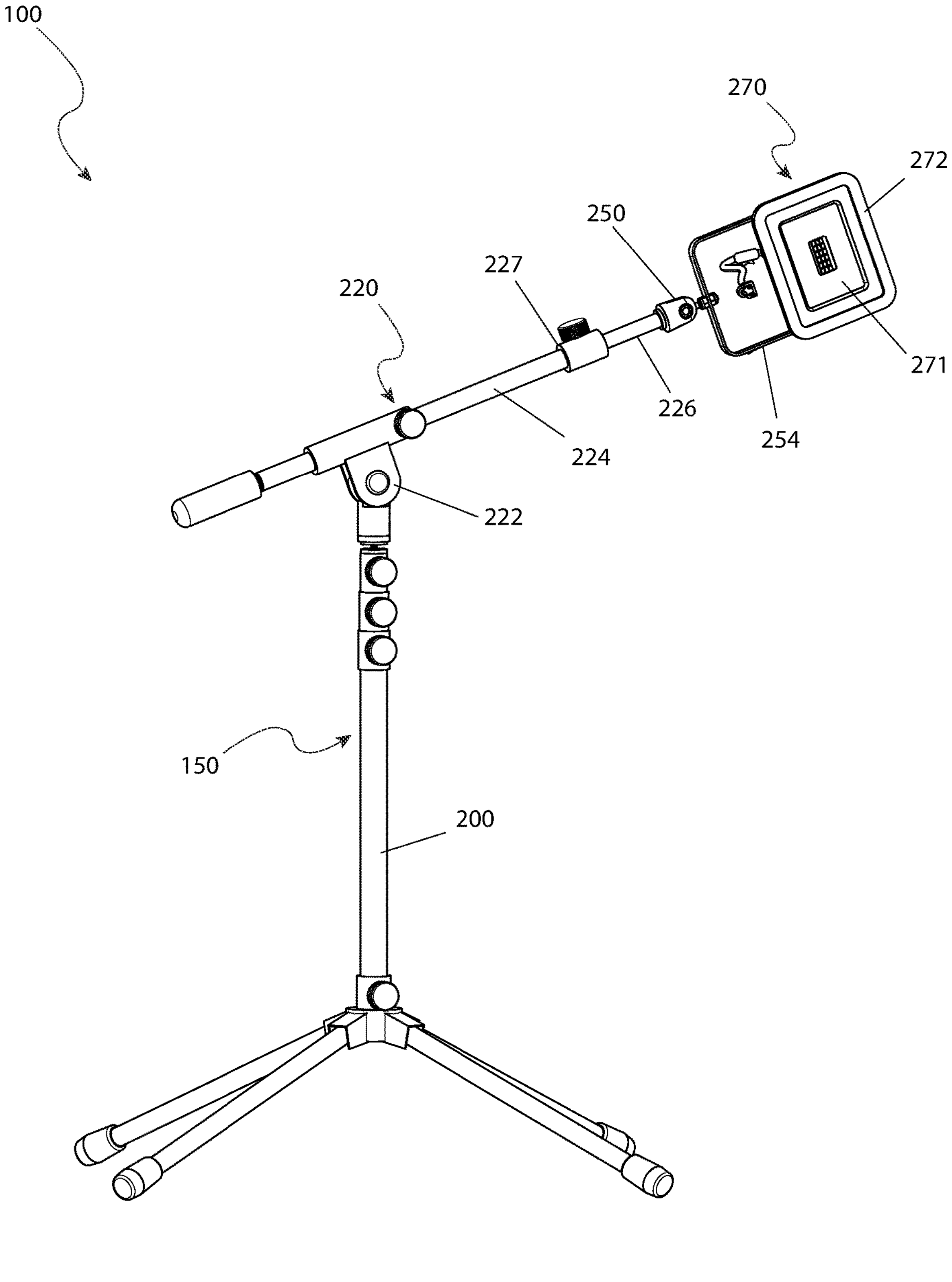
FIG. 5 is an isometric view of a portable light system 100, according to an embodiment of the present device, illustrating an telescoping armature 150, a boom 220 a first tool holder 250, and a floodlight 270.
Figure 6:
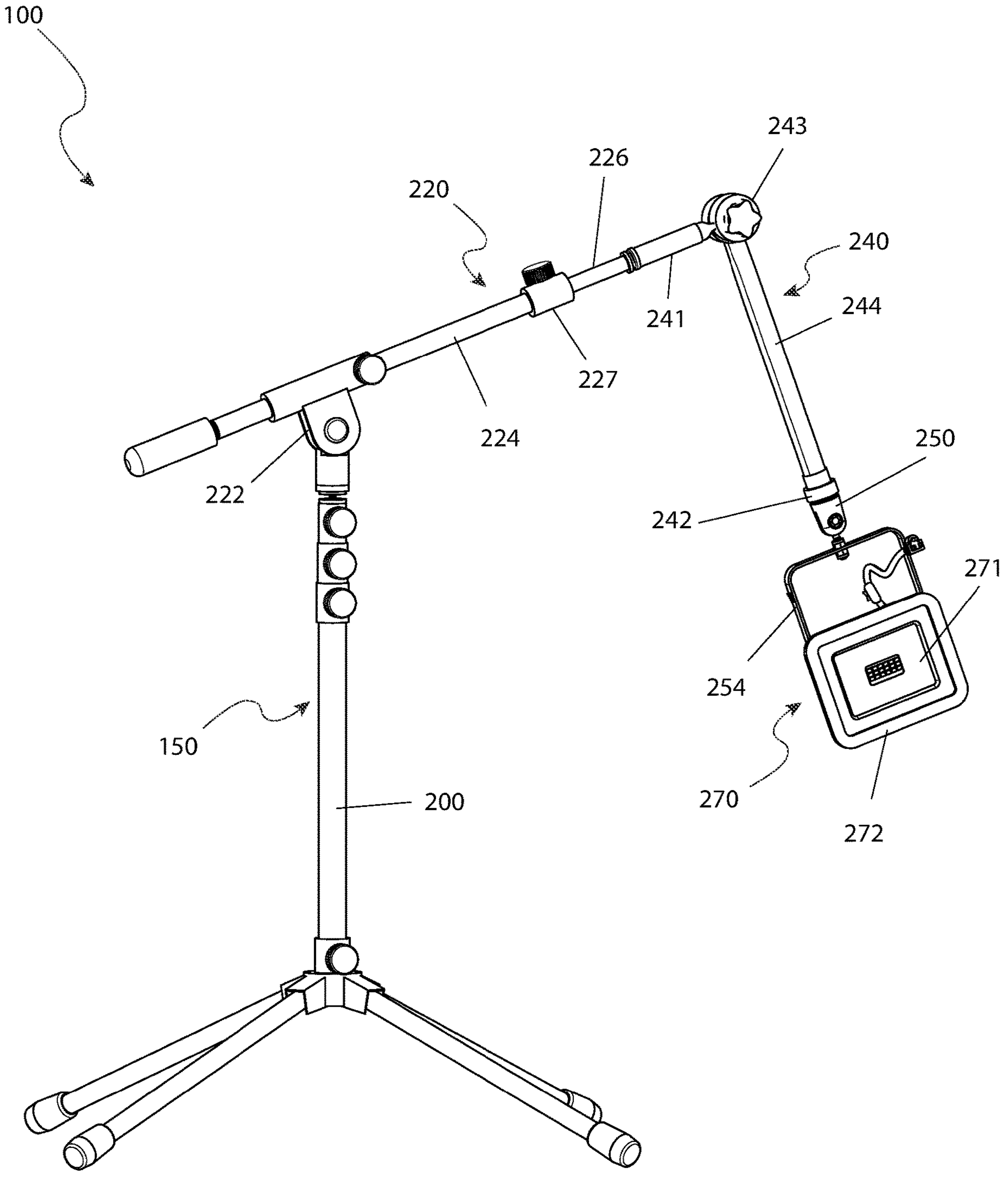
FIG. 6 is an isometric view of a portable light system 100, according to an embodiment of the present device, illustrating an telescoping armature 150, a boom 220, an extender 240, a first tool holder 250, and a floodlight 270.
Figure 7:
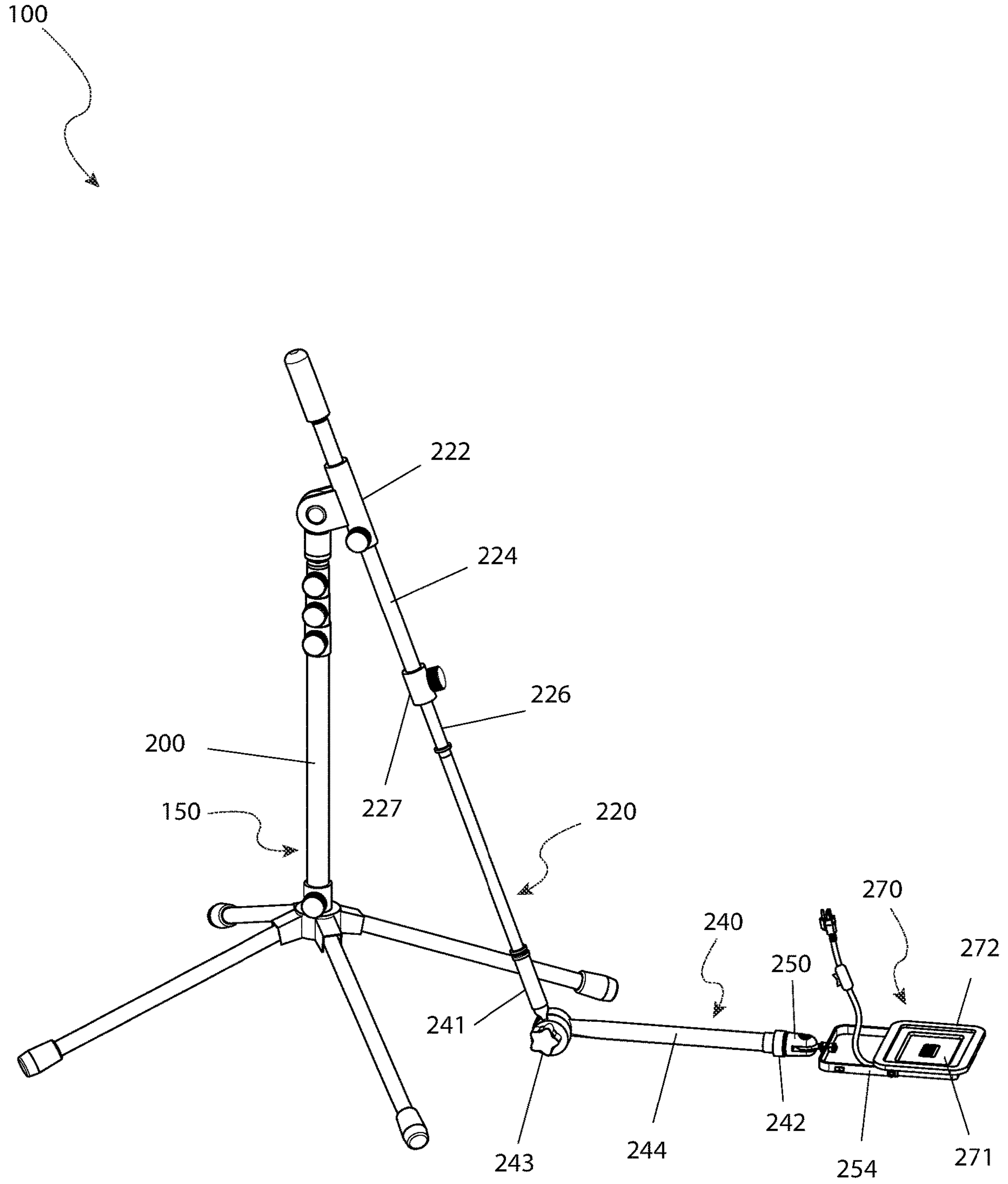
FIG. 7 is an isometric view of a portable light system 100, according to an embodiment of the present device, illustrating an telescoping armature 150, a boom 220, an extender 240, a first tool holder 250, and a floodlight 270 and demonstrating the flexibility to direct light from a low angle.
Figure 8:
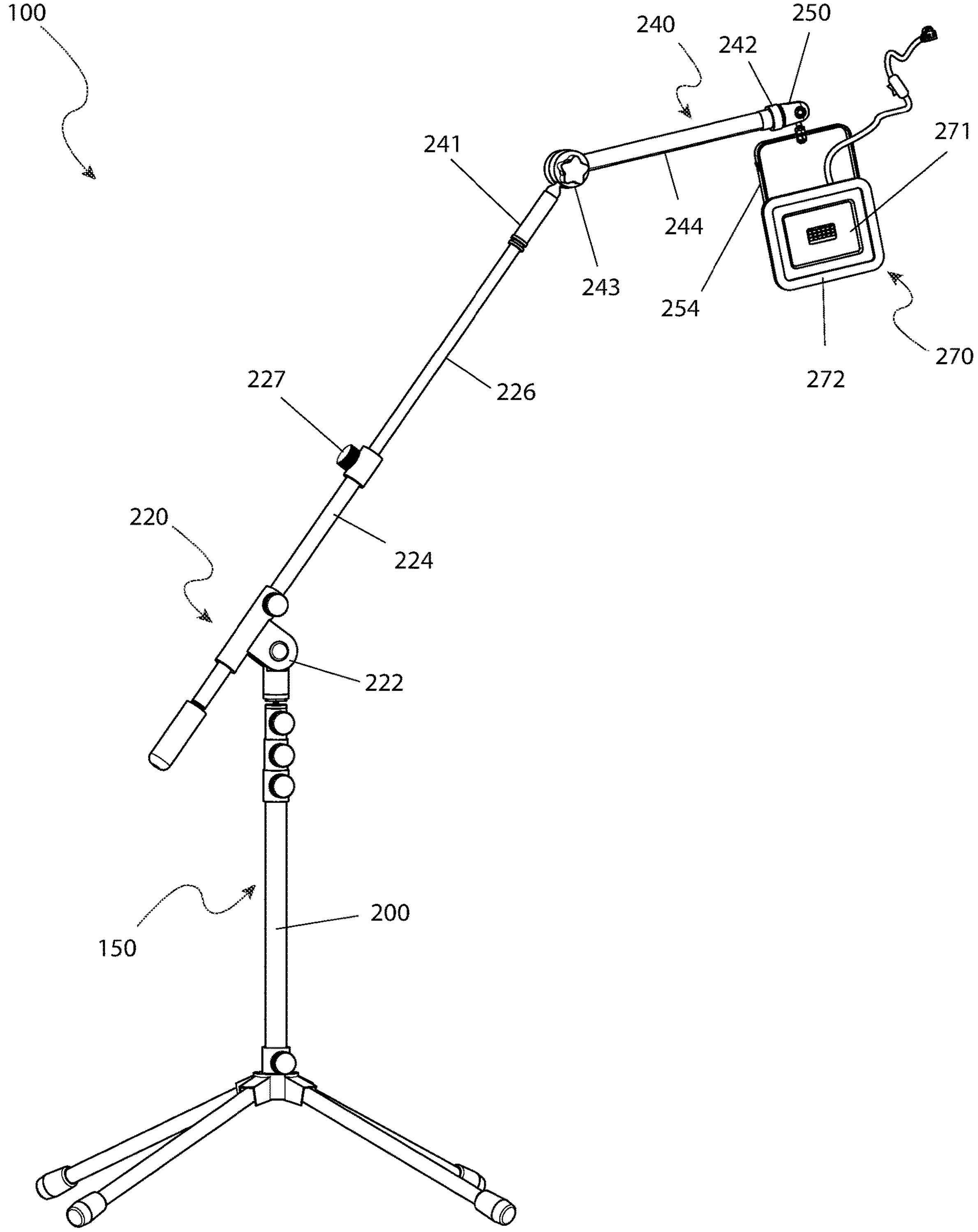
FIG. 8 is an isometric view of a portable light system 100, according to an embodiment of the present device, illustrating an telescoping armature 150, a boom 220, an extender 240, a first tool holder 250, and a floodlight 270 and demonstrating the flexibility to direct light from a high angle.

The extender 240 as seen in FIG. 3, may be an armature that may be coupled to the telescoping armature 150 or to the boom 220. The extender 240 may extend the reach of the device 100 and may redirect the device 100. The extender 240 may comprise a first extender arm 241, a second extender arm 244 pivotally attached to the first extender arm 241 with an extender hinge 243, and a second extender arm 244. The first extender arm 241 may be coupled to the telescoping armature 150 or the boom 220 via a fastening means, which may be a threaded portion of a distal end of the first extender arm 241, or if necessary, with the adapter 290. The second extender arm 244 may pivot through an angle of one hundred eighty degrees (180°) relative to the first extender arm 241 by loosening an extender pivot lock 246, pivoting the second extender arm 244, and tightening the extender pivot lock 246. A second extender coupler 245 may be operable to couple the boom 220 or the first tool holder 250 to the second extender arm 244 opposite the extender hinge 243. Such a coupling can be enabled with a locking nut 242.

Figure 13:
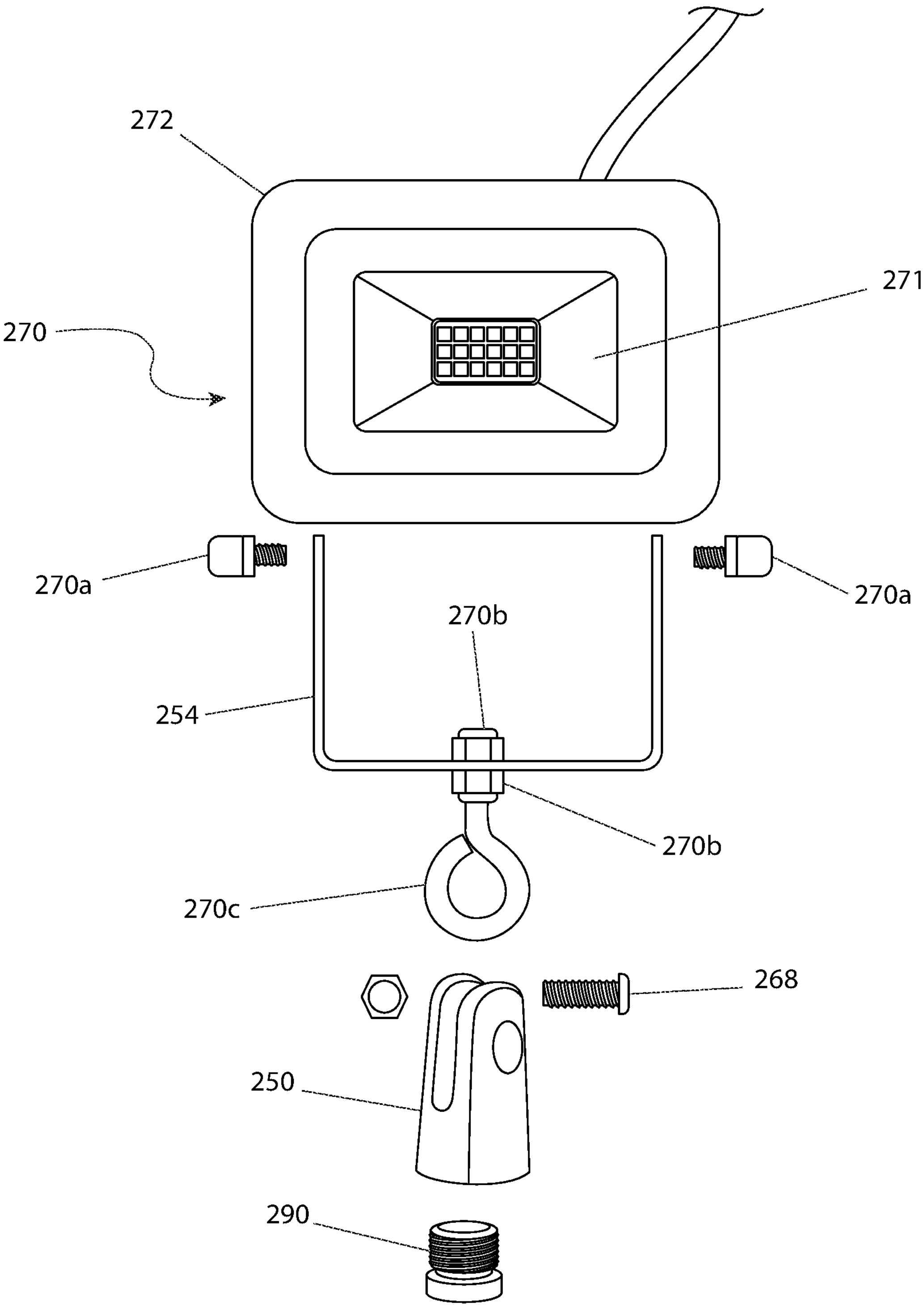

Referring now more closely to FIG. 13, the first tool holder 250 may be operable to couple the floodlight 270 to the telescoping armature 150. The first tool holder 250 may comprise an adapter 290 to assist in coupling the first tool holder 250 to the main coupler 214 of the telescoping armature 150, to the second boom coupler 228 of the boom 220, or to the second extender coupler 245 of the extender 240, perhaps with a locking nut 242. The first tool holder 250 may comprise a fork 254 that may couple a housing 272 of a floodlight 270 thereto via arms of the clamp having first coupler fasteners 270*a* being able to removably affix to a frame of the floodlight 270. The first tool holder 250 may rotate and pivot where it is coupled to the fork 254. This is accomplished with an eyelet 270*c* removably attached to a central point of the bridge of the fork 254 with a second coupler fastener 270*b* and capable of rotational relative thereto. The first tool holder 250 may enable the fork 254 to rotate through three hundred sixty degrees (360°). The first tool holder 250 may enable the fork 254 to pivot through one hundred eighty degrees (180°). The top of the fork 254 may pivotably couple to the floodlight 270. The fork 254 thusly attached may enable the floodlight 270 to pivot through one hundred eighty degrees (180°). In a preferred embodiment, the first coupler fasteners 270*a* may be bolts and the second coupler fasteners 270*b* may be nylon locknuts.

Referring now more closely to FIGS. 9 and 10, the first tool holder 250 may be equipped with a second tool holder 260 to enable coupling the flashlight 280 to the telescoping armature 150, to the boom 220, or to the extender 240. The second tool holder 260 may comprise a flashlight holder 262. The flashlight holder 262 may be configured to hold a cylindrical object such that the cylindrical object may be installed and removed through a gap located at the top of the flashlight holder 262.

The third tool holder 265 may be operable to couple the smart phone, the flashlight 280, the microphone, the alternative light source, or other tool to the system of armatures. The third tool holder 265 may comprise a first tool holder 250 and/or an adapter 290 that may couple the third tool holder 265 to the telescoping armature 150, to the boom 220, or to the extender 240. The third tool holder 265 may comprise a clip 267 which may be operable to hold any object that may be grasped within the clip 267. The clip 267 may pivot at a clip pivot 268 through an angle of one hundred eighty degrees (180°) relative to the clip pivot 268.

As non-limiting examples, the smart phone may be held by the third tool holder 265 in order to record a video or to direct the flashlight function of the smart phone, the microphone may be held by the third tool holder 265 in order to record audio, the alternative light source comprising an existing piece of photographic equipment may be held by the third tool holder 265 to allow continued use of legacy equipment.

The floodlight 270 may be a source of illumination. As non-limiting examples, the floodlight 270 may be configured to illuminate a large area such as an entire wall of a room or a small field outdoors. In some embodiments, the floodlight 270 may comprise a plurality of floodlight LED lights 271 housed within a weatherproof housing 272 and visible through a transparent window. The floodlight 270 may be powered from source of one hundred ten to one hundred twenty volts (110-120 VAC) via a power cord 274. The power cord 274 may comprise a floodlight power switch 275.

The flashlight 280 may be a portable battery-operated source of illumination comprising one (1) or more flashlight LED lights 281 in a cylindrical housing 282. The flashlight 280 may comprise a flashlight power switch 283 to turn the flashlight 280 on and off.

In some embodiments, the device 100 may further comprise one (1) or more adapters 290. The adapters 290 may be operable to couple a tool requiring a specific interface to the telescoping armature 150, the boom 220, or the extender 240.

In some embodiments, the device 100 may further comprise one (1) or more cord grips 292. The cord grips 292 may be operable to retain the power cord 274, audio cables, video cables, and other electrical cords or cables to the device 100.

In use, the device 100 may be set up by unfolding and locking the plurality of legs 202 on the base 200 and placing the base 200 at a venue with the telescoping armature 150 oriented vertically. The boom 220 or the extender 240 may be coupled to the telescoping armature 150. The extender 240 may be coupled to the boom 220 or vice versa. The interconnected system of the telescoping armature 150, the boom 220, the extender 240, or any combination thereof may create a desired configuration of the device 100. The distal end of the device 100 may be positioned where needed by tilting and rotating the device 100. The first tool holder 250, the second tool holder 260, or the third tool holder 265 may be coupled to the distal end of the system of armatures to hold the tool. As non-limiting examples, the first tool holder 250 may hold the floodlight 270, the second tool holder 260 may hold the flashlight 280, and the third tool holder 265 may hold any tool that may be held by the clip 267.

In some embodiments, the counterweight 229 on the boom 220 may be a power inverter 230 that is battery-operated. The power inverter 230 may provide AC power for the floodlight 270 or other devices.

The exact specifications, materials used, and method of use of the device 100 may vary upon manufacturing. The foregoing descriptions of specific embodiments of the present device have been presented for purposes of illustration and description. They are not intended to be exhaustive or to limit the device to the precise forms disclosed, and obviously many modifications and variations are possible in light of the above teaching. The embodiments were chosen and described in order to best explain the principles of the device and its practical application, to thereby enable others skilled in the art to best utilize the device and various embodiments with various modifications as are suited to the particular use contemplated.

What is claimed is:

1. A portable light system comprising:
- a telescoping armature including a base, a plurality of pole segments, and an array of adjustment mechanisms for telescopic adjustments of the pole segments;
- a quadripod stand supporting the telescoping armature, where the stand comprises legs pivotally coupled to a leg hub, and wherein the legs are adapted to be stored parallel to the base;
- a boom assembly including a boom arm, a first boom coupler for coupling the boom arm to the telescoping armature, a boom hinge for pivotal movement, and a boom pivot lock for securing the pivotal position;
- at least one extender with a first extender arm and a second extender arm pivotally attached via an extender hinge, the extender further comprising a second extender coupler for coupling to a distal tool or armature component;
- a plurality of tool holders including a first tool holder with a fork for coupling
- a floodlight, a second tool holder with a flashlight holder, and a third tool holder with a clip for gripping various objects;
- at least one illumination device selected from the group consisting of a floodlight with a plurality of LED lights, and a flashlight with LED lights within a cylindrical housing;
- at least one adapter for coupling the illumination device or tool holders to the telescoping armature, the boom, or the extender as required;
- at least one counterweight for balancing the boom arm, wherein the counterweight is interchangeable with a power inverter comprising at least one battery, an inverter circuit, and at least one AC outlet;
- wherein the boom arm, extender, and tool holders are configurable to extend, retract, and pivot to direct illumination or hold tools in a desired configuration; and,
- wherein the portable light system is collapsible for storage and transportable for field deployment.

2. The portable light system of claim 1, wherein the base is vertically adjustable relative to the leg hub, and each leg of the quadripod stand is at least sixteen inches in length and configurable to slide under an automobile for illumination purposes.

3. The portable light system of claim 1, wherein the telescoping armature comprises a main coupler and a main lock nut at the topmost pole segment for secure attachment of the boom, extender, or tool holders.

4. The portable light system of claim 1, wherein the boom assembly is capable of extending a reach and redirecting the portable light system via the boom arm, which is adjustable in length and rotational angle.

5. The portable light system of claim 1, wherein the first tool holder is capable of coupling a floodlight to the system via a fork with first coupling fasteners and an eyelet allowing rotational and pivotal movement of an attached floodlight.

6. The portable light system of claim 1, wherein the second tool holder is adapted to hold a flashlight, and the third tool holder is adapted for securing a smart phone, microphone, or an alternative light source.

7. The portable light system of claim 1, wherein the floodlight is powered via a power cord that includes a power switch and the flashlight is battery-operated with a dedicated power switch.

8. The portable light system of claim 1, wherein the adjustment mechanisms include features enabling a sliding and rotational movement of the base or individual pole segments relative to adjacent sections upon loosening and tightening of associated locking knobs.

9. The portable light system of claim 1, further comprising at least one cord grip for retaining electrical cords or cables to the portable light system.

10. A method of using a portable light system of the proceeding claims, the method comprising:
- first, deploying the quadripod stand by unfolding and locking its legs;
- second, vertically adjusting the telescoping armature for height positioning;
- third, attaching the boom and/or extender to the telescoping armature;
- fourth, configuring the boom and extender lengths and angles for desired reach and direction;
- fifth, attaching the first, second, or third tool holder to the distal end of the boom or extender;
- sixth, engaging the illumination device for lighting an area; and,
- last, utilizing a power inverter, when present, as a counterweight and source of AC power for the floodlight or other devices.

* * * * *